United States Patent Office 3,302,790
Patented Feb. 7, 1967

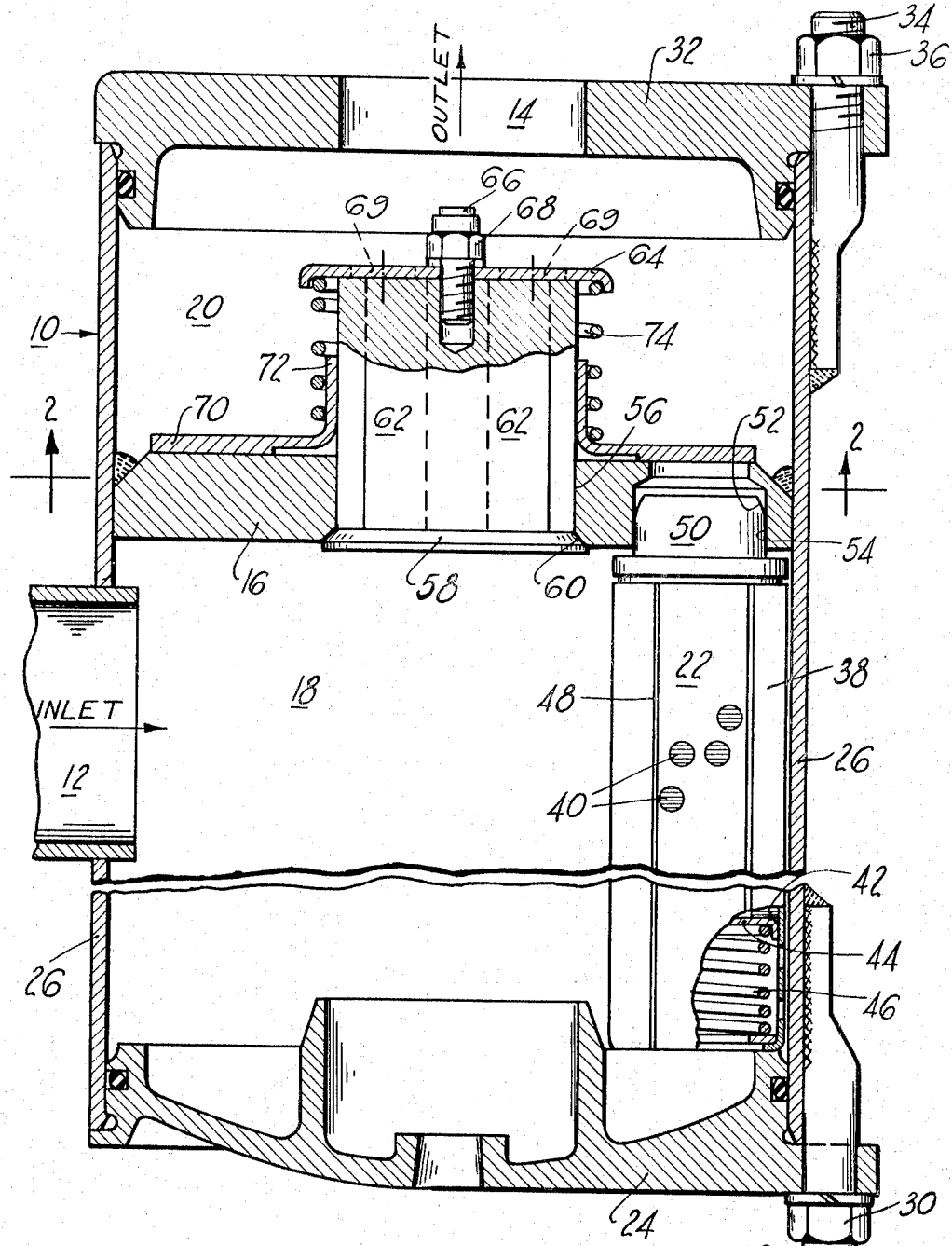

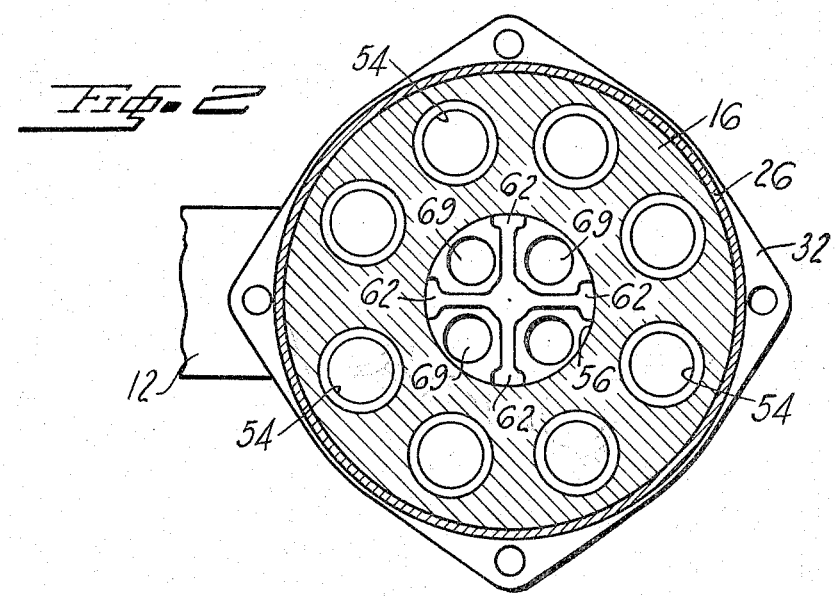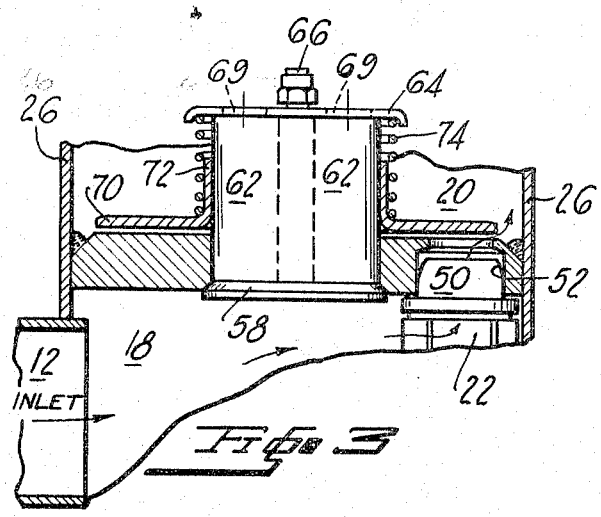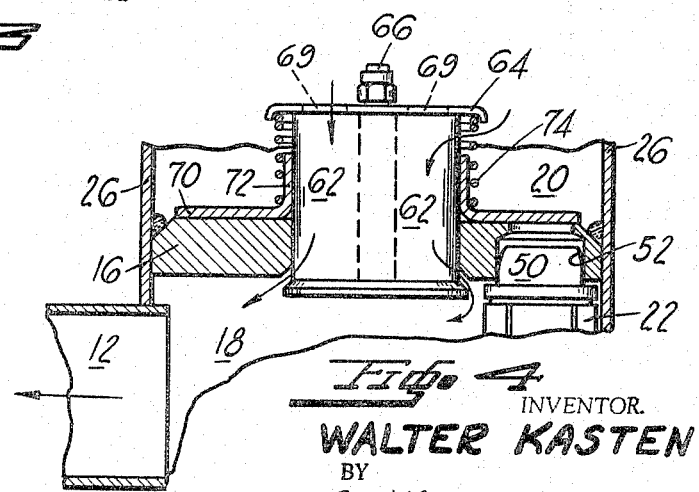

3,302,790
FILTER UNIT HAVING CHECK VALVES INSURING ONE-WAY FLOW
Walter Kasten, Madison Heights, Mich., assignor to The Bendix Corporation, Madison Heights, Mich., a corporation of Delaware
Filed May 13, 1964, Ser. No. 367,070
3 Claims. (Cl. 210—134)

This invention relates to a filter unit of the type which may be used as a fuel monitoring device and more particularly to improvements in a fuel quality testing device of the type described in my Patent No. 3,117,925.

In certain types of fueling installations, the equipment, which is utilized, is not only used to fuel aircraft but is also used to defuel returning aircraft. For example, aircraft operating from aircraft carrier decks are fueled prior to flight, and upon returning from a flight mission are defueled so as to reduce the fire hazard when parked beneath the flight deck. Such defueling is generally accomplished by using the same equipment which is used during fueling. However, in those fueling systems which incorporate a fuel monitoring device of the type shown in my Patent No. 3,117,925, special valves and piping are necessary to prevent fuel from flowing through the washer-type filter or fuse elements in the reverse direction during the defueling operation, that is in a direction opposite to the normal flow. If flow through the fuse elements in the reverse direction were permitted, such inside-out flow could lodge solid particles between the washers which form the fuse elements or otherwise damage the washer stacks, since under reverse flow conditions, the washers would be subjected to tensile stresses rather than compression stresses, as is the case under normal outside-in flow conditions. Since the washers of the fuse elements are usually formed of cellulose materials which have a much higher compression strength than tensile strength, it will be obvious that such reverse flows must be avoided.

Accordingly, it is an object of this invention to provide a fuel monitoring device of the foregoing type which may be installed in a conventional fueling and defueling system without requiring additional external piping and by-pass valving.

Another object of this invention is to provide certain internal structural modifications in a fuel monitoring device of the type described which will permit bidirectional flow through the device without risk of damage to the washer-type fuse elements therein, thereby permitting use of the monitoring device in aircraft fueling systems which are also used for defueling aircraft.

More specifically, it is an object of this invention to provide a fuel monitoring device of the type described which includes an internal reverse flow shunt valve that will permit normal outside-in flow through the filter or fuse elements of the device but will prevent inside-out flows through the elements by causing reverse flows through the device to completely bypass the elements.

The above and other objects and features of this invention will become apparent from the following description taken in connection with the accompanying drawings which form a part of this specification and in which:

FIGURE 1 is a view partially in section of a fuel monitoring device incorporating my invention;

FIGURE 2 is a sectional view taken substantially along line 2—2 of FIGURE 1;

FIGURE 3 is a fragmentary sectional view showing the position of the reverse flow shunt valve during normal fuel flow through my fuel monitoring device, that is, during a fueling operation; and FIGURE 4 is another fragmentary sectional view showing the position of the reverse flow shunt valve during reverse fuel flow through my fuel monitoring device, that is, during a defueling operation.

Referring to FIGURE 1 of the drawings, it will be seen that numeral 10 indicates a housing having a fuel inlet port 12 and a fuel outlet port 14. Suitably attached to the housing is a partition 16 which separates the interior of the housing into an inlet chamber 18 and an outlet chamber 20. A plurality of filter or fuse assemblies 22 (only one of which is shown in FIGURE 1) are suitably attached to the partition 16 and are retained in position by a retainer plate 24 which is part of housing 10 and is operatively connected to a cylindrical portion 26 of the housing 10 by a plurality of bolts 28 and nuts 30 (only one of which is shown). Another plate 32, which contains fuel outlet port 14, is located at the opposite end of the cylindrical portion 26 of the housing 10 and is operatively connected thereto by a plurality of bolts 34 and nuts 36 (only one of which is shown).

Each filter or fuse assembly 22 includes a metal tubular housing 38 having a plurality of perforated ports 40, a porous tubular edge-type filter element 42 formed from a plurality of washers in registered face-to-face contact, a moveable endplate 44, and a spring 46 for placing the edge type filter element under a suitable calibrated pre-compression. The washers may be formed from paper, cellulose, or other suitable fibrous or nonfibrous materials and are arranged so that flow through the filter element 34 will be via the radially extending pores formed between the washers. In the arrangement shown in FIGURE 1, flow will be from outside the filter element to inside the filter element. The metal wrapper 38 is formed with axially extending indentations or ribs 48 for maintaining the washers in proper alignment and is operatively connected to a plastic (polyethylene) nipple-like ferrule 50 which has a curved outer surface 52 for effecting a seal with one of the openings or filter ports 54 of the partition 16. For additional details regarding this type of fuse assembly, reference may be made to my Patent No. 3,117,925.

It will be noted from FIGURES 1 and 2 that the filter or fuse assemblies 22 are arranged in a circle around a center opening or return port 56 located in partition 16. A poppet type valve 58, which is located in opening 56 and seats on valve seat 60, is arranged to prevent flow through return port 56 when flow through the unit is in the normal operating direction, that is during the fueling operation. The poppet valve 58 has radially extending guide arms 62 formed as a part thereof and a spring retainer 64 suitable connected thereto through means such as bolt 66 and nut 68. The spring retainer has a plurality of openings 69 therein for permitting unrestricted flow to the center opening 56. A plate valve 70 having a cylindrical portion 72 which encircles the guide arms 62 seats on the partition surface surrounding the filter ports 54 and prevents flow therethrough during conditions of zero flow and reverse flow. A light valve spring 74 which encircles the guide arms 62 of poppet valve 58 and abuts the spring retainer 64 and plate valve 70, urges both the poppet valve 58 and the plate valve 70 towards their closed positions.

During normal flow, which will occur during fueling of an aircraft, the fuel passing through the filter assemblies 22 from outside thereof to the inside thereof will force plate valve 70 to an open position, as shown in FIGURE 3. Such movement of the plate valve will increase the compression of the valve spring 74 and assure a more effective seal at the return port 56 by urging the poppet valve 58 more tightly against its valve seat 60. In the event of reverse flow, which will occur during defueling of an aircraft, poppet valve 58 will open, as shown in FIGURE 4. Such movement of the poppet valve will likewise increase the compression of the valve spring 74 and thereby assure a more effective seal at the filter ports 54 by urging the plate valve 70 more tightly against partition 16. Thus, in a very effective manner, use of a common spring 74 for two directional valves, prevents damaging reverse flow through the filter assemblies 22.

It should be noted that my invention is not restricted to use only in fueling systems where the defueling feature is required. For example, the fuel monitoring device disclosed herein may be installed in a system where there is a long flexible rubber hose on the downstream side of the gage. In such a system, wherein a shut off or nozzle valve is normally used at the end of the hose to disperse fuel, it is quite common for surge pressures to cause momentary expansions of the hose which may result in reverse flows and surges through the fuses. My invention is also useful in installations which require rather long pipes or static relaxation tanks downstream of the monitoring device. In this latter type of installation, it is common practice to keep such pipe sections or tanks full of fuel to prevent moisture accumulation due to condensation. However, small air pockets oftentimes occur in such downstream lines which during the closing of the outlet valve compress and expand in such a manner that reverse flow through the fuses will occur. My invention obviously will prevent damage to the filter assemblies under such conditions of reverse flow.

Those acquainted with this art will readily understand that the invention herein set forth is not necessarily limited and restricted to the precise and exact details presented and that various changes and modifications may be resorted to without departing from the spirit of my invention. Accordingly, I do not desire to be limited to the specific deails described herein, primarily for purposes of illustration, but instead desire protection falling within the scope of the appended claims.

Having thus described the various features of the invention, what I claim as new and desire to secure by Letters Patent is:

1. A fluid filtering device comprising housing means having fluid inlet and outlet passage means, partition means connected to said housing means and located between said inlet and outlet passage means, a central return port and a plurality of surrounding filter ports located in said partition means for permitting communication between said inlet and outlet passage means, normally porous means operatively connected to said partition means at each of said filtering ports for filtering the fluid flowing from said inlet passage means to said outlet passage means, and valve means operatively connected to said partition means for directing normal fluid flow from said inlet passage means to said outlet passage means via said porous means and filter ports and for directing reverse fluid flow from said outlet passage means to said inlet passage means via said return port, said valve means comprising a first valve for closing said return port during normal fluid flow, a second valve for closing said filter ports during reverse fluid flow, and common spring means for urging said first and second valves towards their closed positions.

2. A fluid filtering device, as defined in claim 1, wherein said normally porous means comprises a plurality of washer-like elements arranged in registered face-to-face contact to form a tubular member having radially extending pores between said washer-like elements for permitting flow of fluid therethrough from outside said tubular member to inside said tubular member and spring means for placing said washer-like elements under compression.

3. A fluid filtering device comprising housing means having fluid inlet and outlet passage means, partition means connected to said housing means and located between said inlet and outlet passage means, a single central return port and a plurality of surrounding filter ports located in said partition means for permitting communication between said inlet and outlet passage means, normally porous means operatively connected to said filter ports for filtering the fluid flowing from said inlet passage means to said outlet passage means, and valve means operatively connected to said partition means for permitting fluid flow from said inlet passage means to said outlet passage means only via said porous means and filter ports and for permitting reverse fluid flow from said outlet passage means to said inlet passage means only via said return port, said valve means including first valve seat means located on the inlet passage means side of said partition means, second valve seat means located on the outlet passage means side of said partition means, a first valve member seatable on said first valve seat means for preventing fluid flow from said inlet passage means to said outlet passage means via said single central return port, said first valve member including guide means which extend through said single central return port to the outlet passage means side of said partition means and a spring retainer operatively connected to said guide means, a second valve member seatable on said second valve seat means for preventing reverse fluid flow from said outlet passage means to said inlet passage means via said plurality of surrounding filter ports, and a single compression spring which abuts said spring retainer and said second valve member for uring both said first valve member and second valve member towards their respective valve seat means.

References Cited by the Examiner

UNITED STATES PATENTS

| 2,191,636 | 2/1940 | Walker | 137—493.6 X |
| 2,598,131 | 5/1952 | O'Donnell | 210—431 |
| 3,117,925 | 1/1964 | Kasten | 210—96 |

FOREIGN PATENTS

| 616,300 | 1/1961 | Italy. |

REUBEN FRIEDMAN, *Primary Examiner.*

F. SPEAR, *Assistant Examiner.*